UNITED STATES PATENT OFFICE.

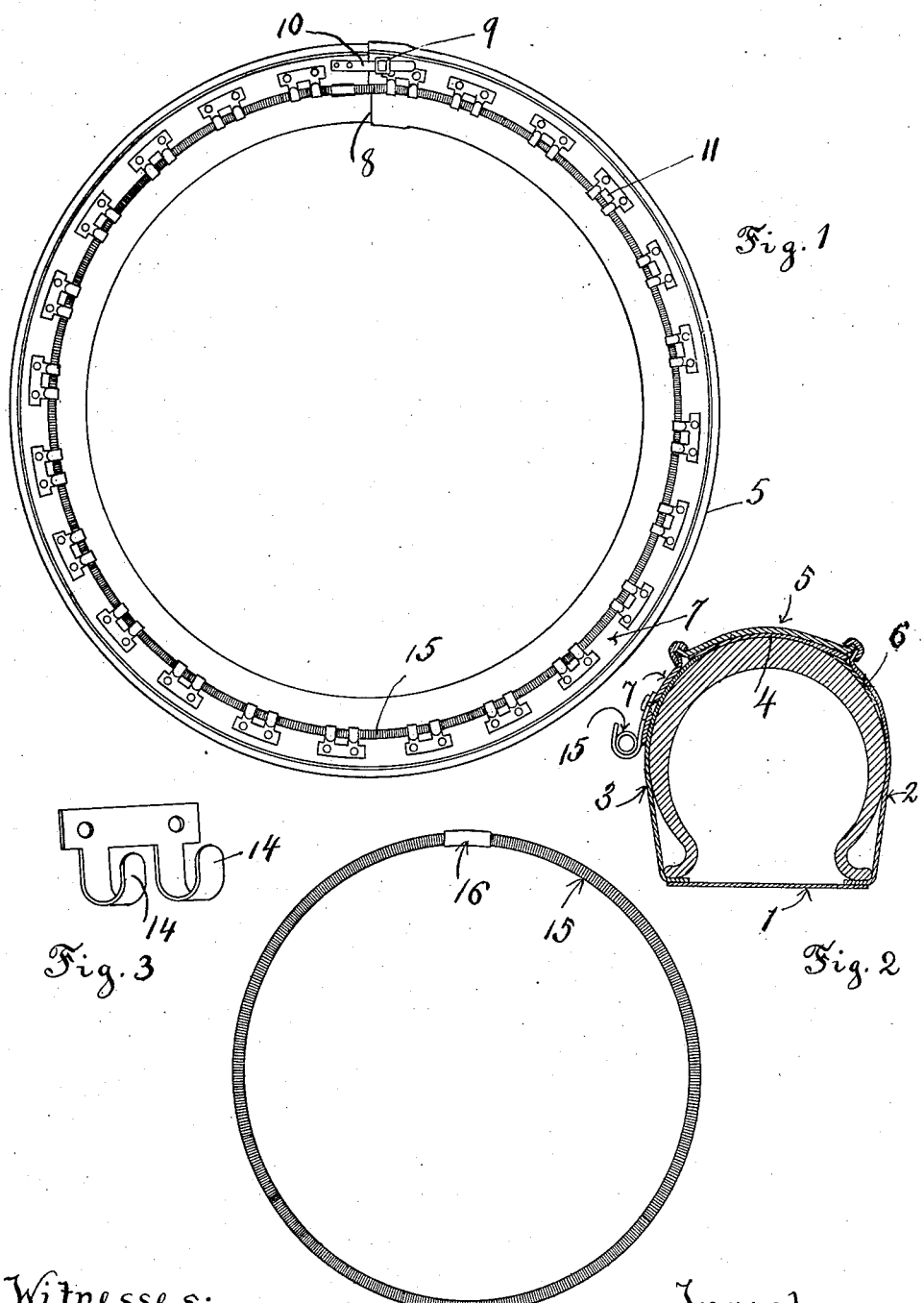

FREDSON E. BOWERS, OF NEW HAVEN, CONNECTICUT.

TIRE-CASE.

No. 915,069.   Specification of Letters Patent.   Patented March 16, 1909.

Application filed March 2, 1908. Serial No. 418,697.

*To all whom it may concern:*

Be it known that I, FREDSON E. BOWERS, a citizen of the United States, residing at New Haven, in the county of New Haven and State of Connecticut, have invented certain new and useful Improvements in Tire-Cases; and I do hereby declare the following to be a full, clear, and exact description of the invention, such as will enable others skilled in the art to which it appertains to make and use the same.

The present invention relates to tire cases for inclosing and protecting the spare shoes or tires carried on automobiles, the object of the present invention being to produce a tire case of simplified construction and to simplify the means whereby the case is secured on the tire or shoe.

To the above ends the present invention consists of the improved tire case which will now be described and claimed.

The present invention is illustrated in the accompanying drawing, in which:—

Figure 1 shows the case in side elevation and illustrating my improved fastening. Fig. 2 shows a cross sectional view. Fig. 3 shows one of the hooked plates, and Fig. 4 the elastic binder member of the fastening device.

Similar reference characters will be employed throughout the specification and drawing to designate corresponding parts.

The case proper is made up of any suitable flexible material, preferably waterproof, and is designed to be wrapped about the tire from the rim portion outward, and to overlap at the tread portion, and it is preferably made up of strips or sections sewed together so as to form a neat fitting case and to conform to the curved lines of the tire or shoe, and as shown in the drawing the case comprises a strip 1 of a width to cover the inner or rim portion of the tire or shoe and the side flaps 2 and 3 for covering the sides of the tire or shoe, and to each of the side flaps 2 and 3 there is secured what I will call "crown strips" 4 and 5, which overlap upon the tread portion of the tire. These "crown strips" 4 and 5 are provided with laterally extending flaps 6 and 7, which, when the case is in use, extend a suitable distance along the sides of the tire or shoe adjacent to and within the tread portion.

The case is open as shown at 8 and when placed upon the tire the ends will preferably overlap each other, as shown, and will be held by any suitable fastening means, preferably by the buckle and strap 9 and 10 connecting the outer flap 7. The flaps 6 and 7 are cut in circular form somewhat less in diameter than the diameter of the tire, so that when the case is applied to the tire, the flaps 6 and 7 will rest along the sides of the tire and within the circumference thereof, and when the meeting ends of the flap 7 are buckled it forms a continuous retaining flap of less diameter than the diameter of the tire which cannot be passed over the tire without unbuckling, and thus the case will be retained on the tire without the use of extraneous or other fastening means. However, to positively insure against the extended displacement or loosening of the case the flap 7 is preferably provided with the hooked members 11 of the fastening, these hooked members preferably each carrying a pair of open hooks 14. The hooks 14 are adapted to receive the elastic binder 15, which forms the other member of the fastening, and which, as shown in the drawing, preferably consists of a closely coiled spring normally of a circumference less than the circumferential line of hooked plates so that in placing the elastic binder in the hooks 14 it will be necessary to stretch or expand the same, and thus the contracting force of the binder will securely hold the flap 7 close to the side of the case and within the line of the tread portion thereof. The binder is preferably formed endless, as by connecting the ends by the union or coupling 16.

In the operation of my invention the case is wrapped around the tire from the inner or rim portion outwardly and overlapped at the tread portion so as to bring the retaining flap 7 on the tire side and lying closely against the side of the tire. The strap and buckle 9 and 10 will be connected, thus drawing the ends of the case and the retaining flap closely together, and as before explained, the retaining flap being of less circumference or diameter than the inclosed tire it will afford means for retaining the case on the tire. Should the hooks and elastic binder be employed, they will be arranged as shown in Fig. 1 of the drawing and will afford additional means for fastening the case.

Having described my invention I claim as new and desire to protect by Letters Patent of the United States:—

1. A tire case for spare tires provided with overlapping flaps at the tread portion, a retaining flap cut in circular form and of less diameter than the diameter of the tread of the tire connected to the outer edge of the outer flap and extending about the outer side of the tire, the case and retaining flap divided at one point in the circumference and means for connecting the divided ends of the retaining flap, substantially as described.

2. A tire case for spare tires provided with overlapping flaps at the tread portion, the outer flap extending about the side of the tire within the circumference thereof and provided with a series of hooked members and an endless elastic binder normally of less circumference than the circumferential line of hooked members extending circumferentially about and engaging said hooked members, substantially as described.

3. A tire case for spare tires provided with overlapping flaps at the tread portion, the outer flap extending about the side of the tire within the circumference thereof and provided with a series of hooked members and an elastic binder comprising an endless coiled spring extending circumferentially about and engaging said hooked members, substantially as described.

In testimony whereof I affix my signature, in presence of two witnesses.

FREDSON E. BOWERS.

Witnesses:
  G. B. LINDLEY,
  M. A. MERRIAM.